Figure 1:
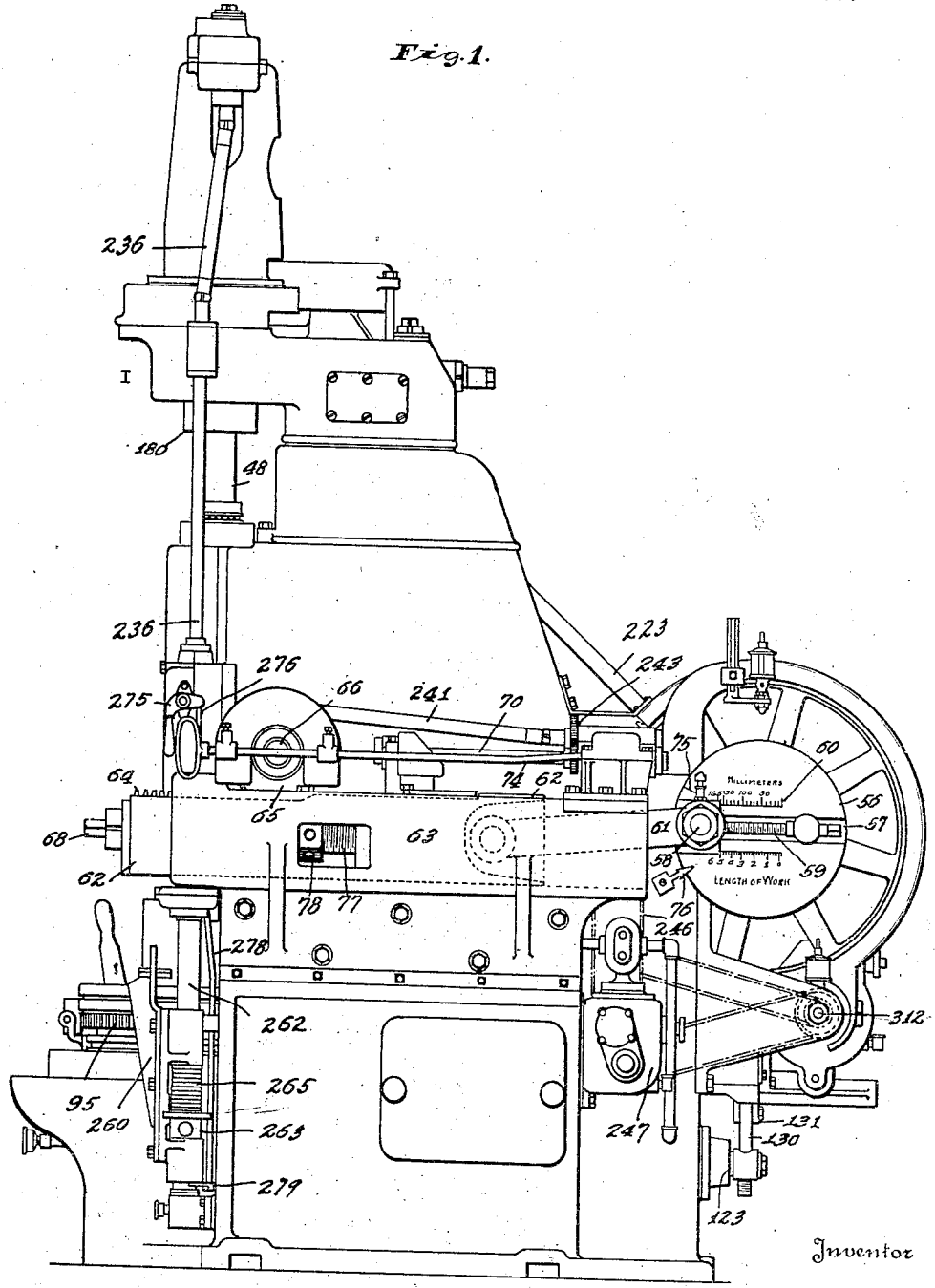

Aug. 26, 1924.

G. R. STEVENSON 1,506,095

MACHINE FOR FORMING GEARS OR OTHER POLYGONAL ARTICLES

Filed Dec. 17, 1921     13 Sheets-Sheet 1

Inventor

George Russell Stevenson,

By Arthur M. Hood

Attorney

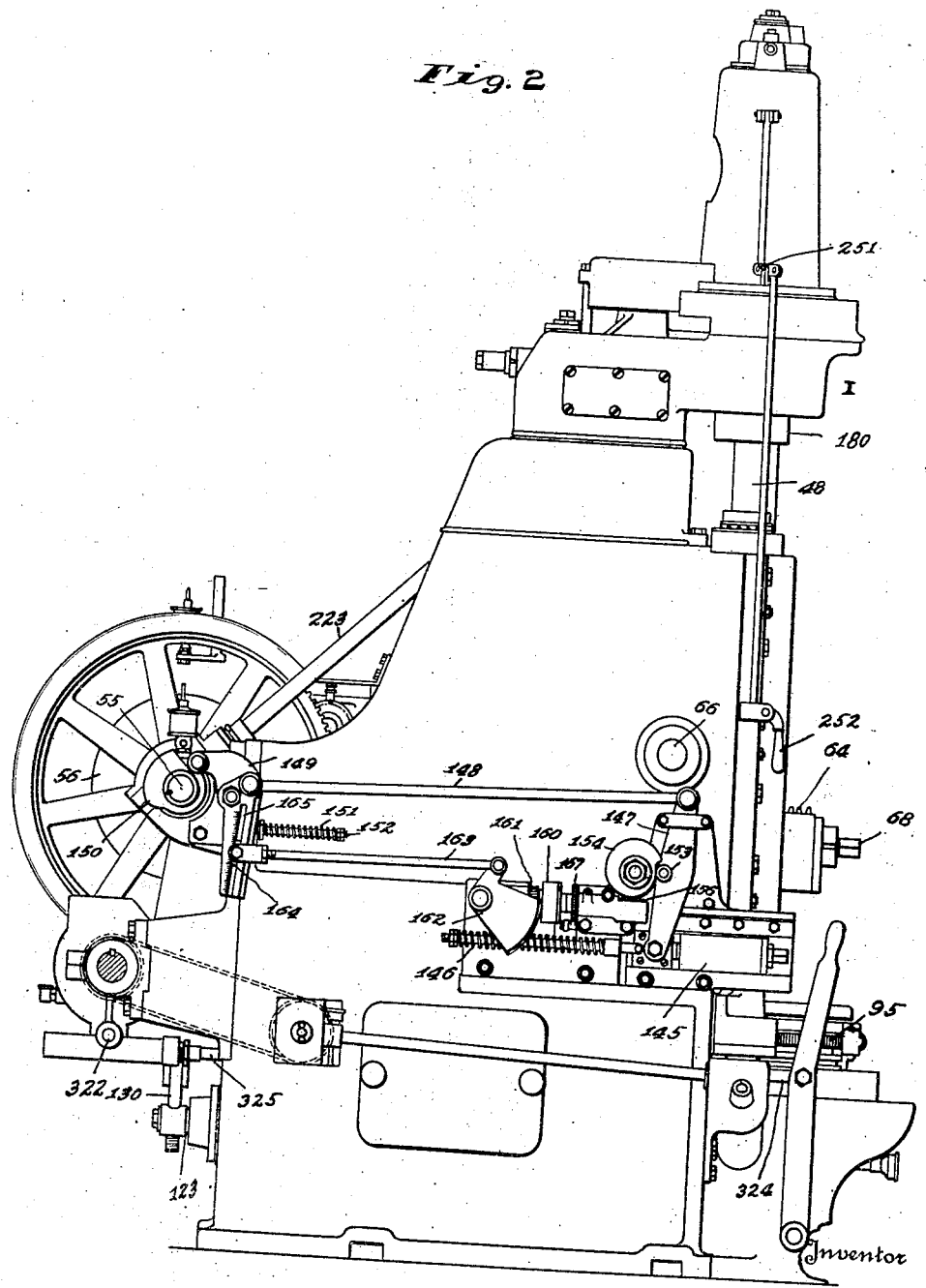

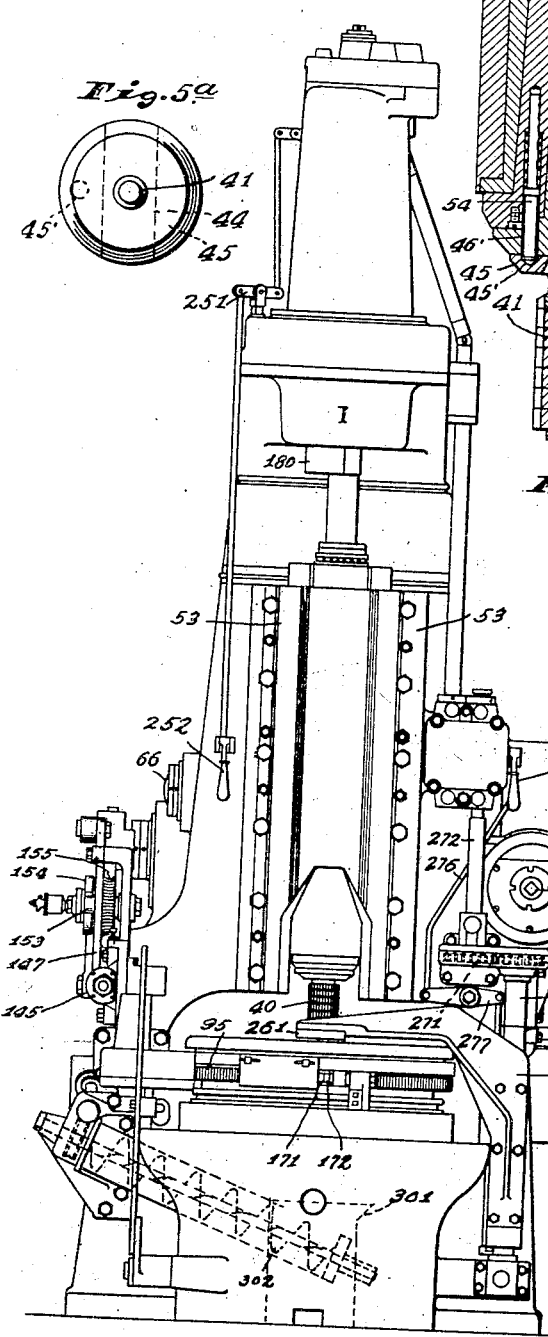

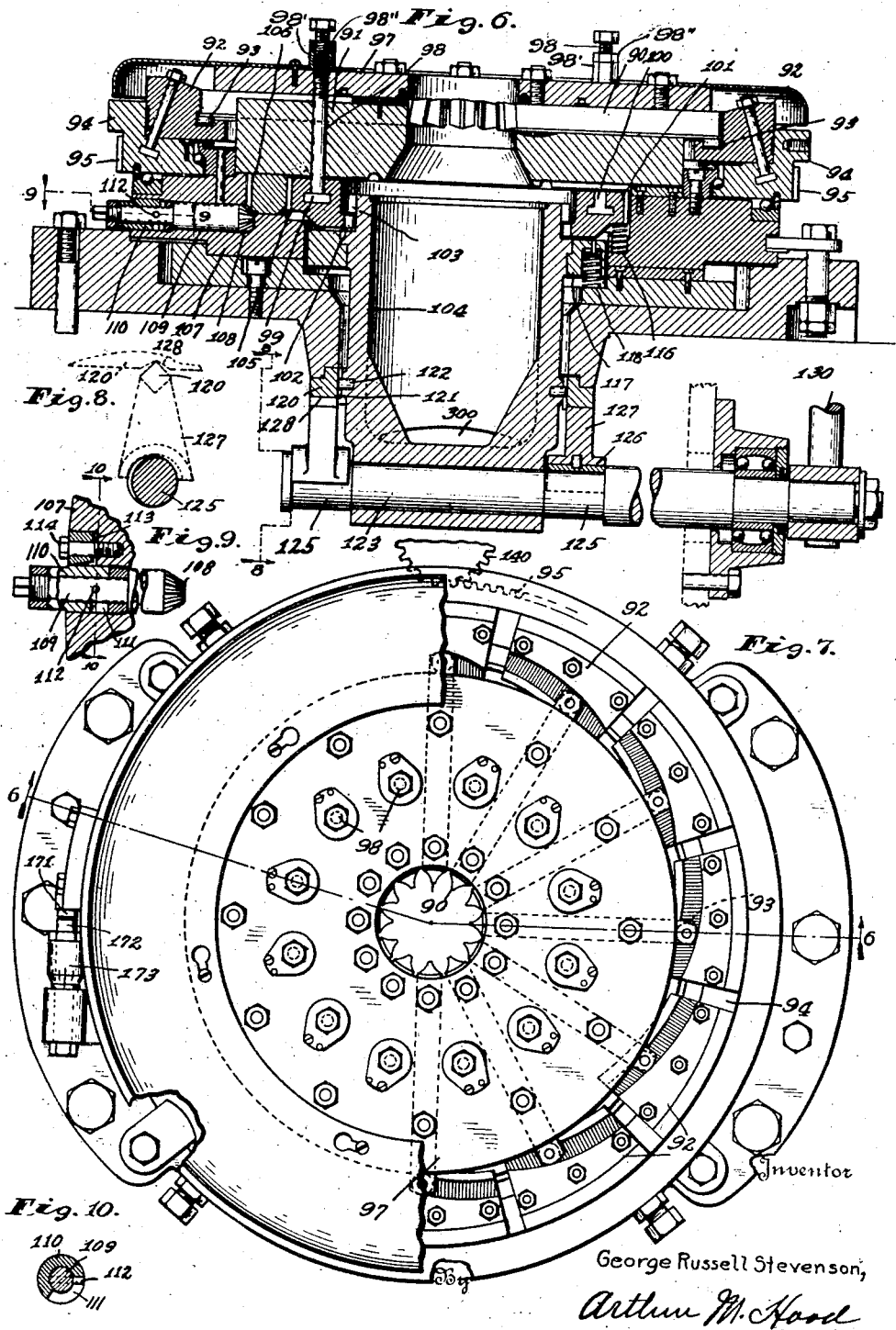

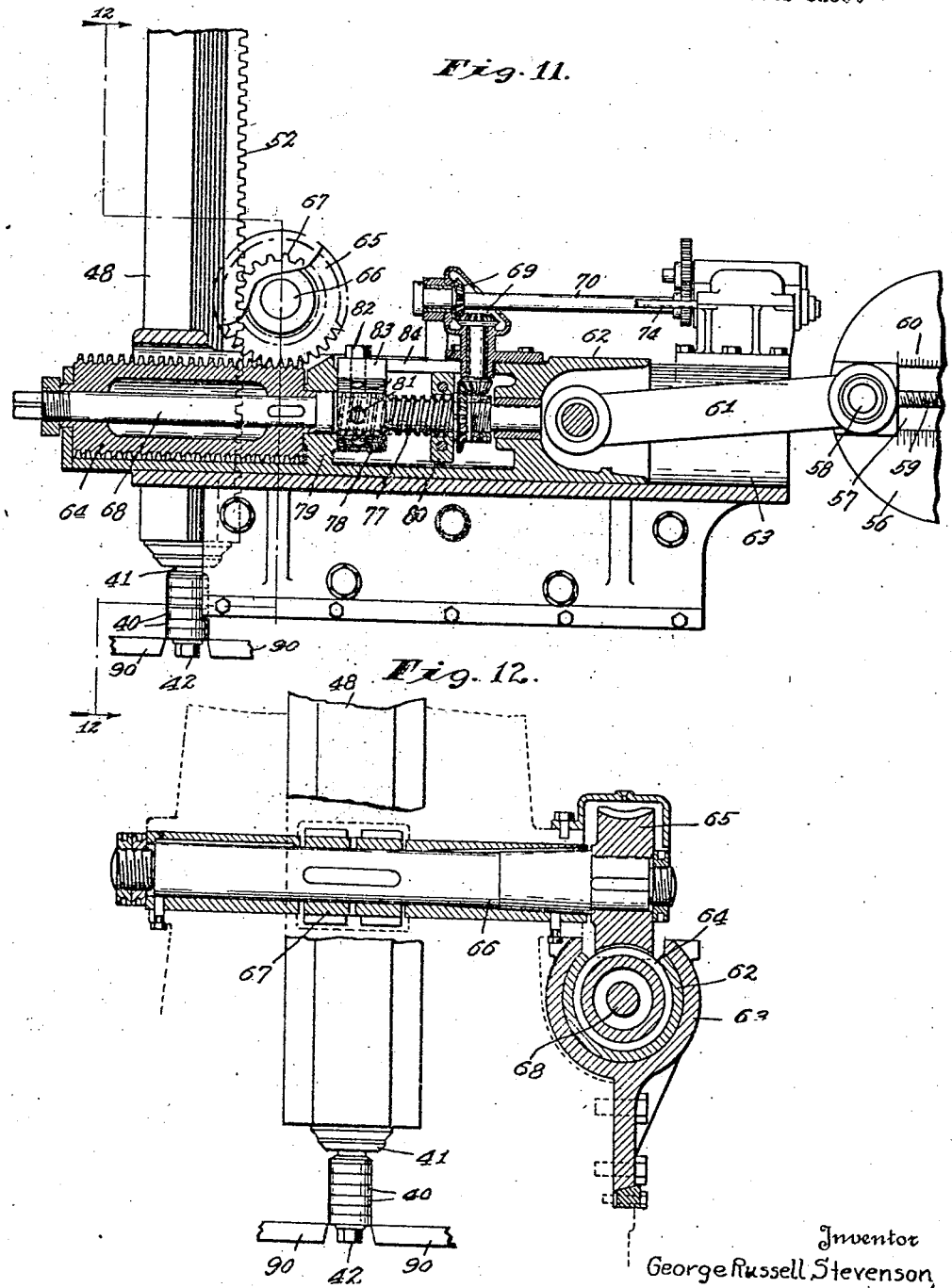

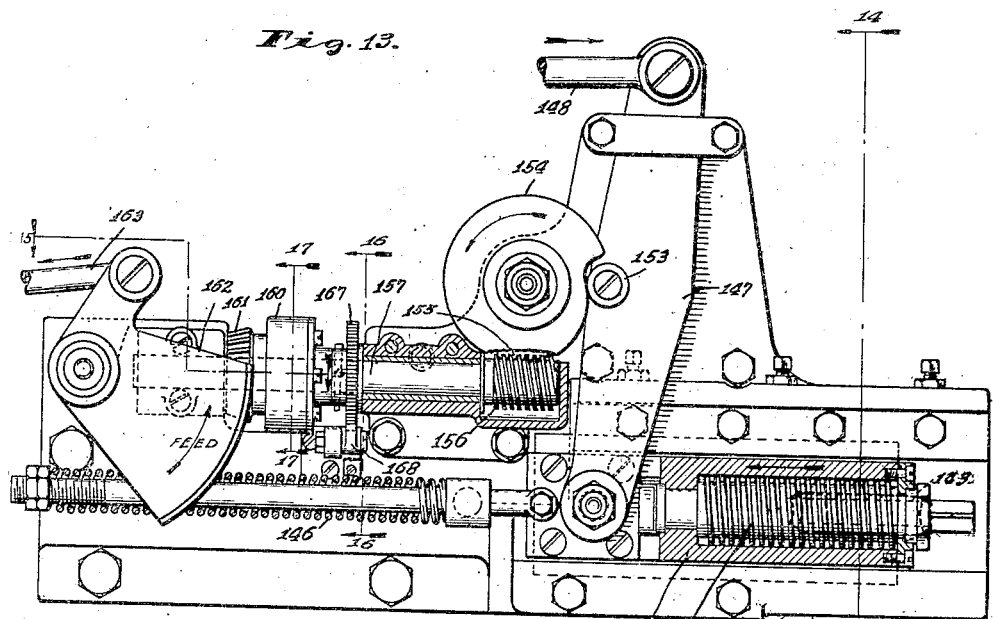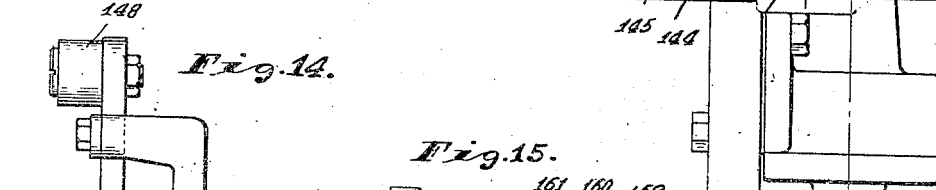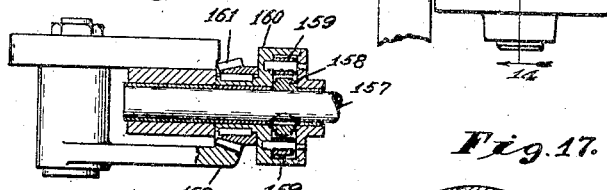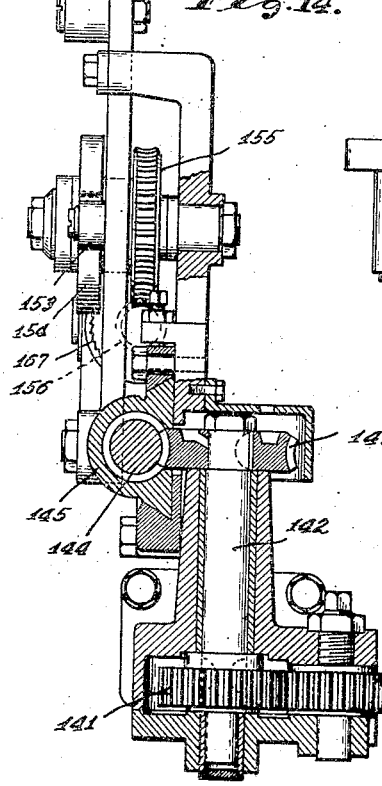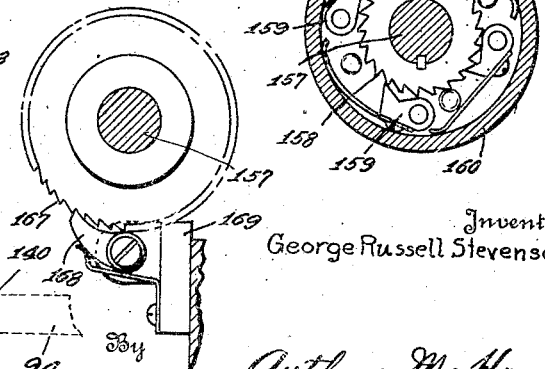

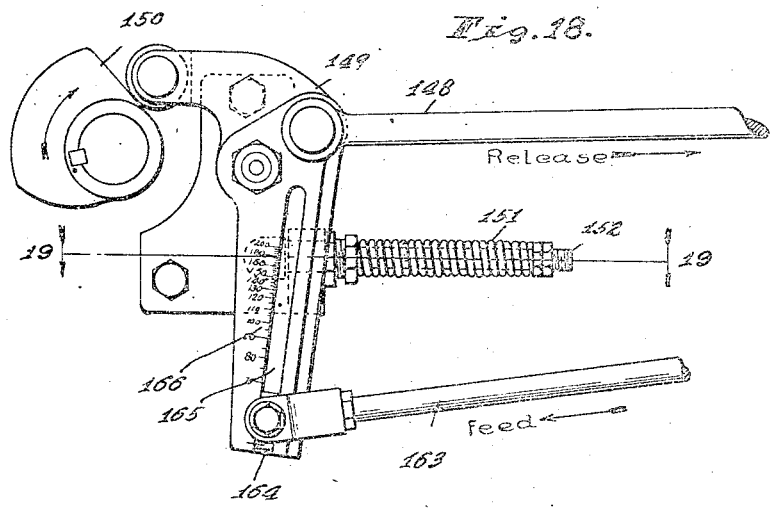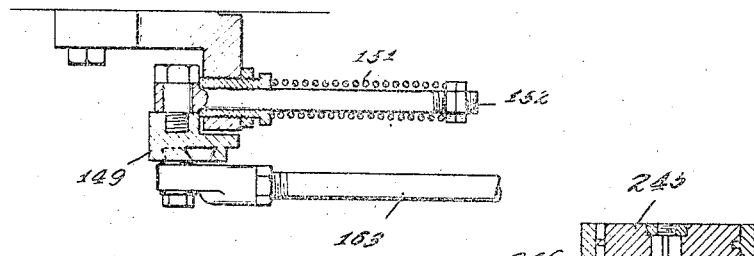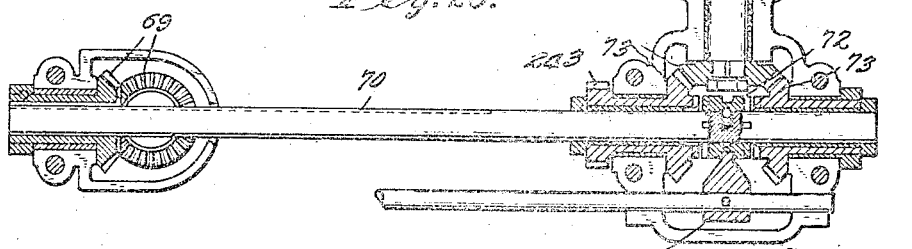

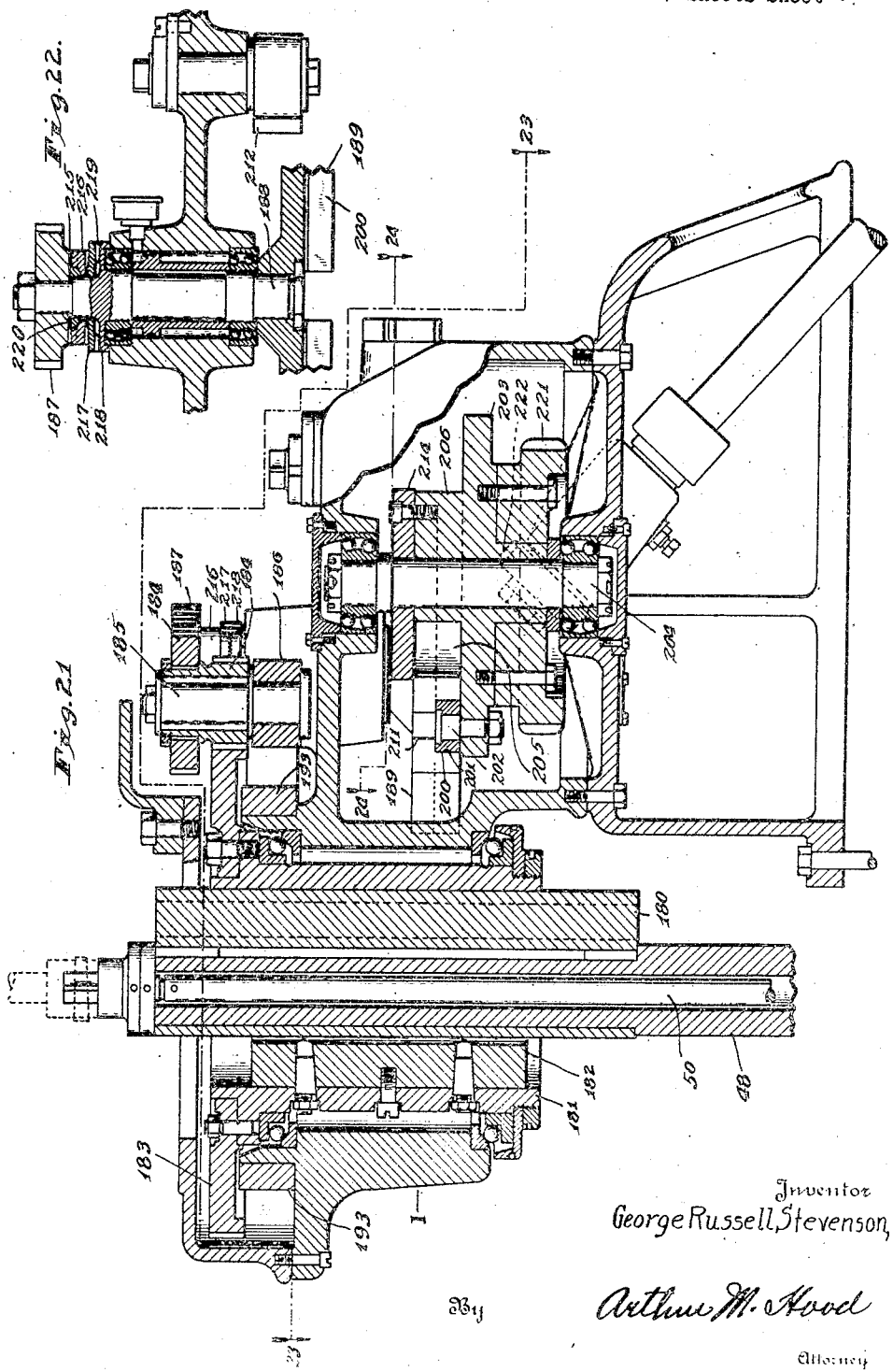

Aug. 26, 1924.    1,506,095
G. R. STEVENSON
MACHINE FOR FORMING GEARS, OR OTHER POLYGONAL ARTICLES
Filed Dec. 17, 1921    13 Sheets-Sheet 9
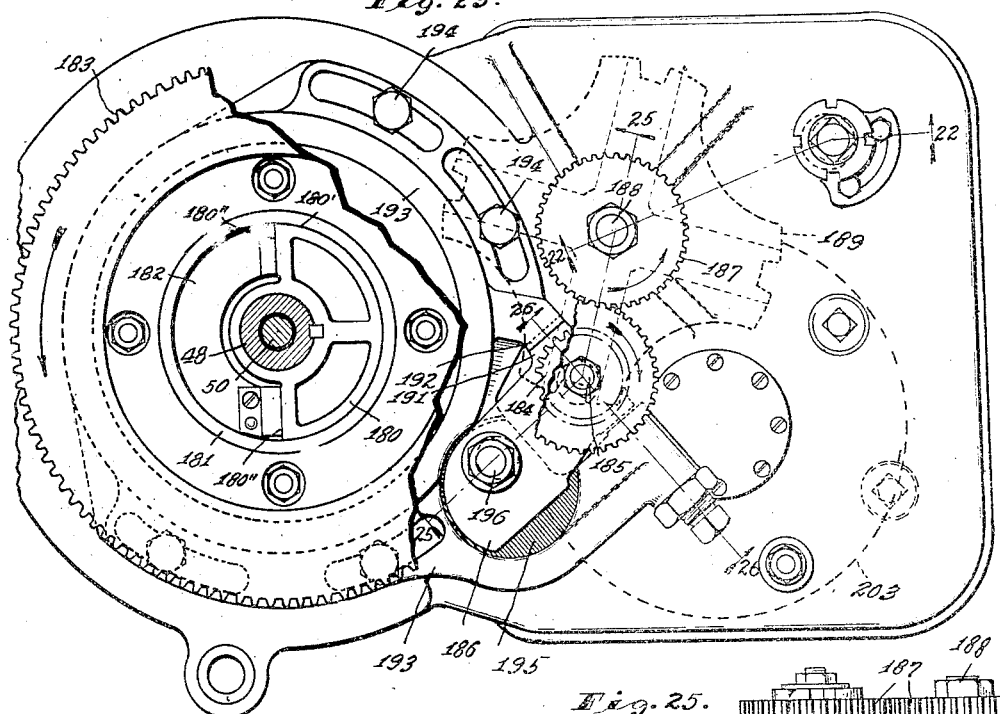
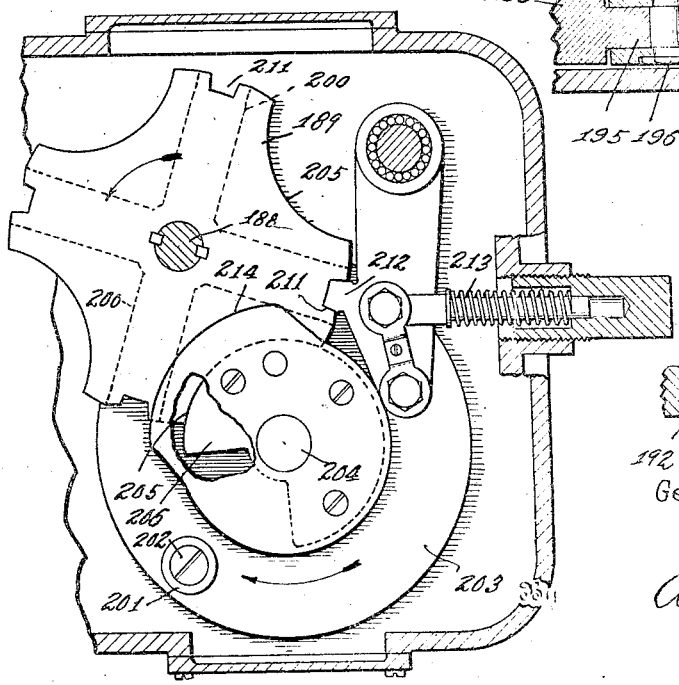
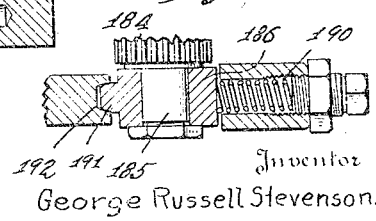
Inventor
George Russell Stevenson.
Arthur M. Hood
Attorney Aug. 26, 1924.
G. R. STEVENSON
1,506,095
MACHINE FOR FORMING GEARS OR OTHER POLYGONAL ARTICLES
Filed Dec. 17, 1921　　13 Sheets-Sheet 10
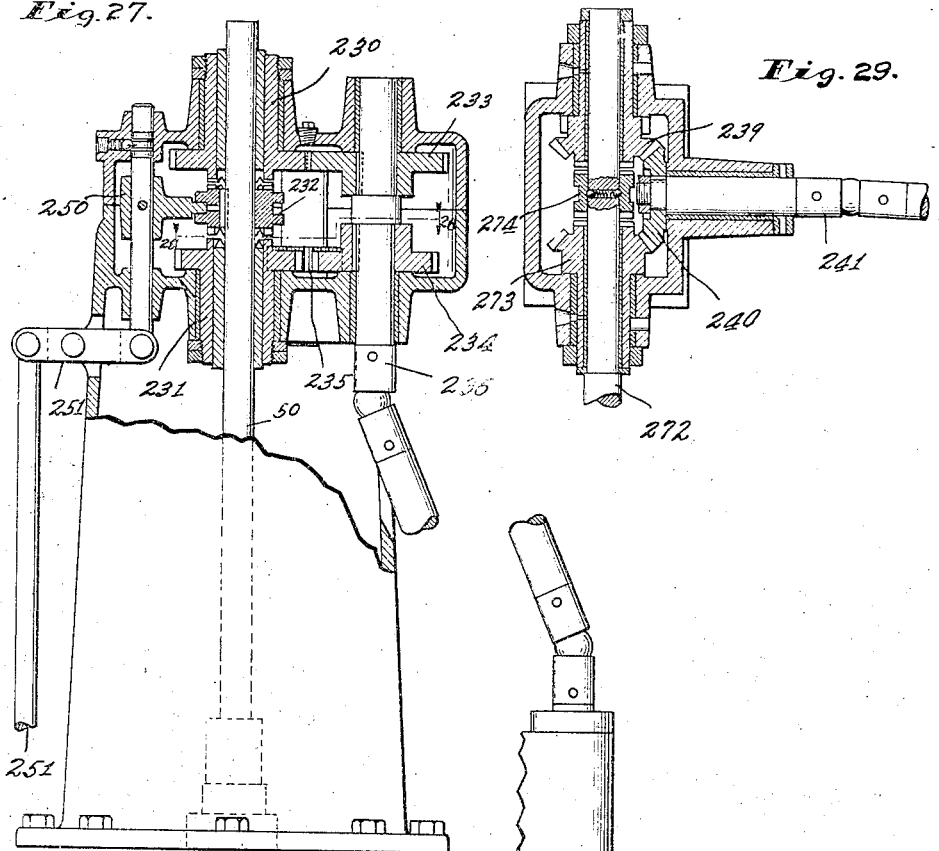
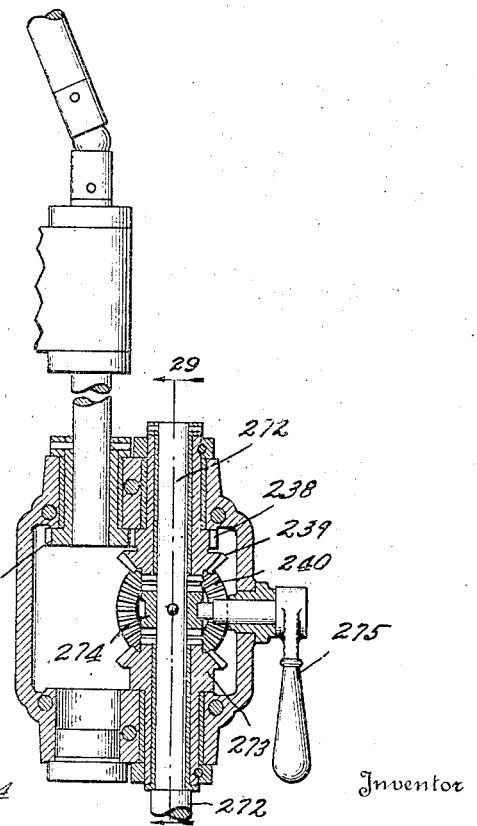
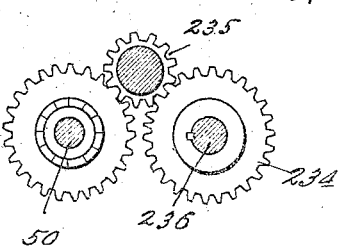
Inventor
George Russell Stevenson,
By Arthur M. Hood
Attorney Aug. 26, 1924.
G. R. STEVENSON
1,506,095
MACHINE FOR FORMING GEARS OR OTHER POLYGONAL ARTICLES
Filed Dec. 17, 1921    13 Sheets-Sheet 11
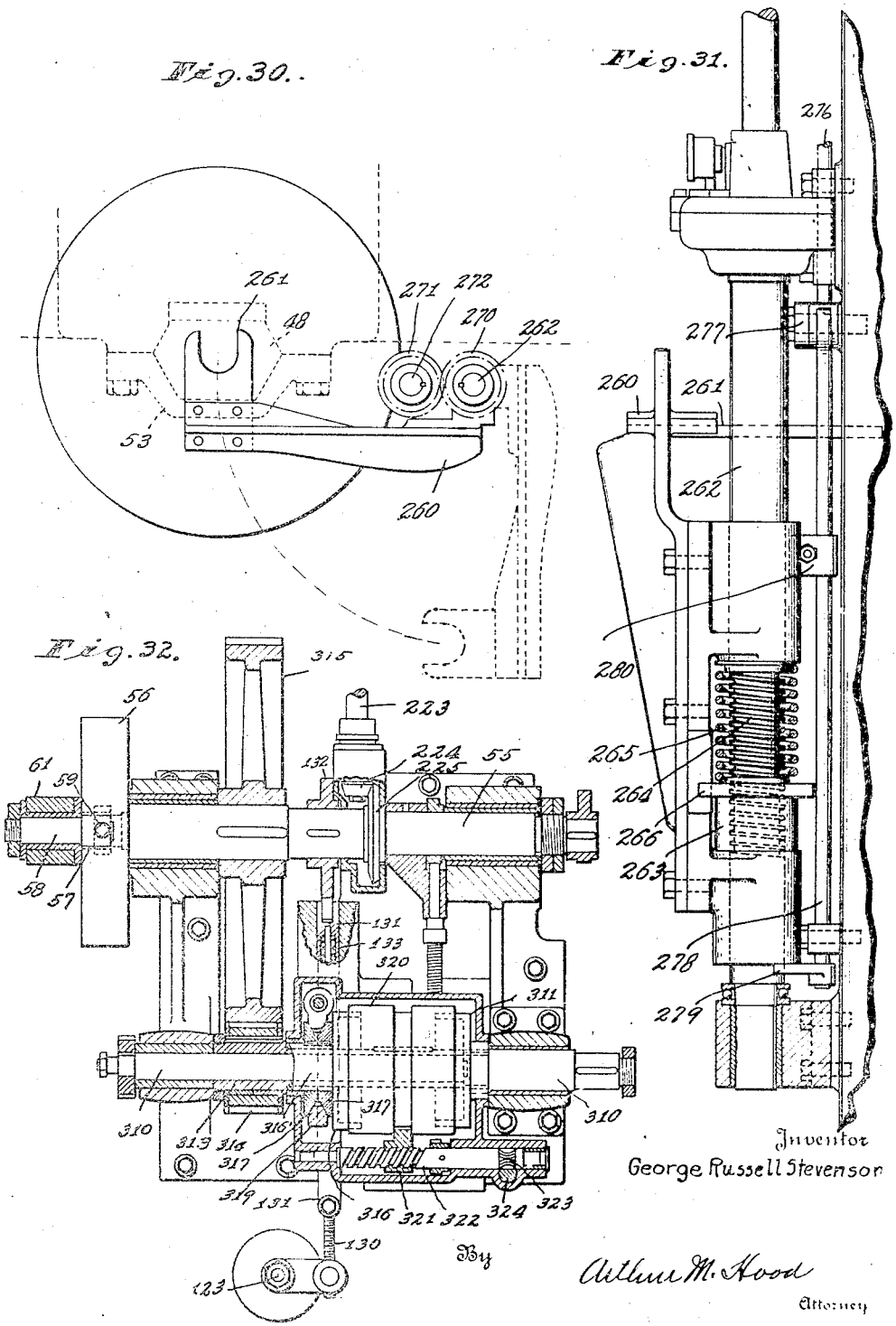
Inventor
George Russell Stevenson
By Arthur M. Hood
Attorney Aug. 26, 1924.
G. R. STEVENSON
1,506,095
MACHINE FOR FORMING GEARS OR OTHER POLYGONAL ARTICLES
Filed Dec. 17, 1921
13 Sheets-Sheet 12
Fig. 33.
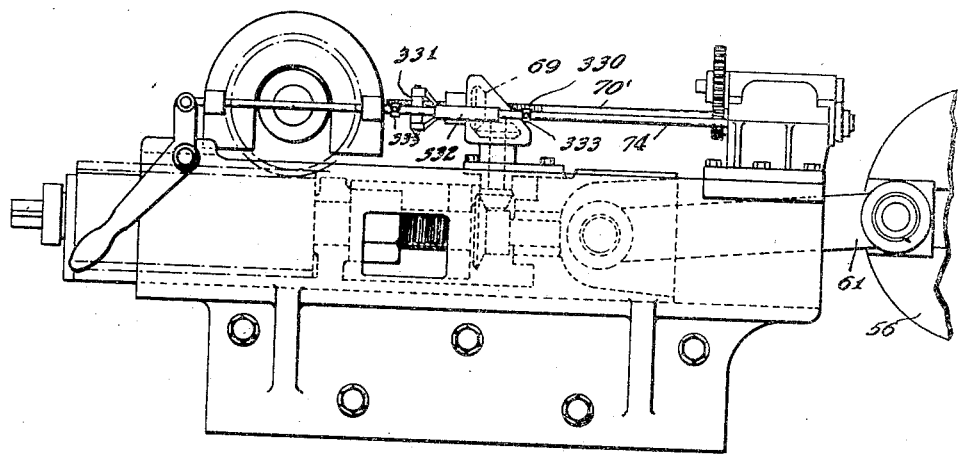
Fig. 34.
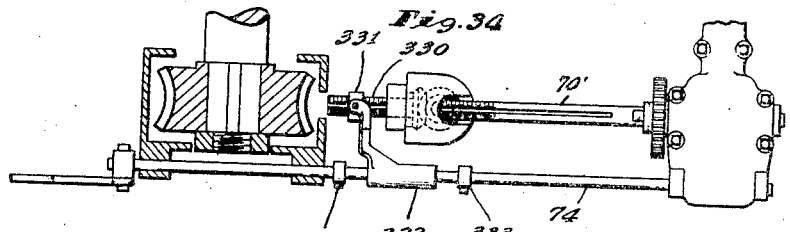
Fig. 35. Fig. 36. Fig. 38. Fig. 37.
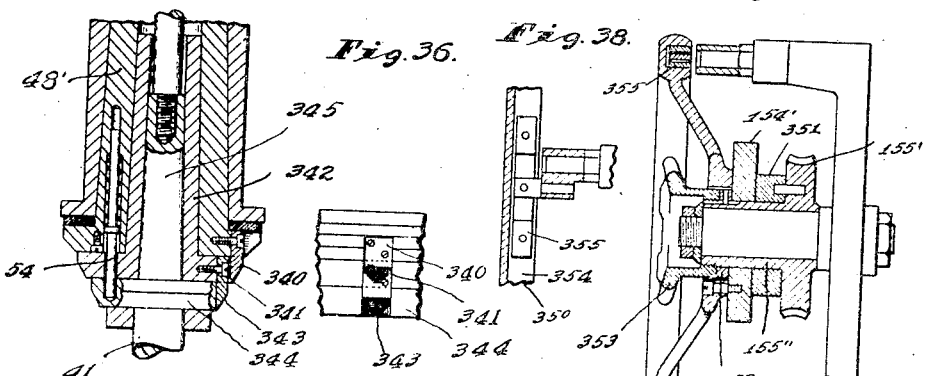
Fig. 39.
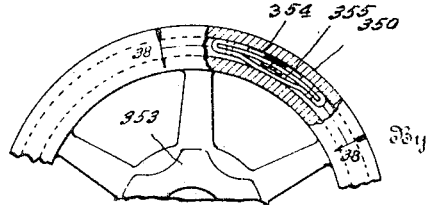
Inventor
George Russell Stevenson,
Arthur M. Hood
Attorney Aug. 26, 1924.
G. R. STEVENSON
1,506,095
MACHINE FOR FORMING GEARS OR OTHER POLYGONAL ARTICLES
Filed Dec. 17, 1921    13 Sheets-Sheet 13
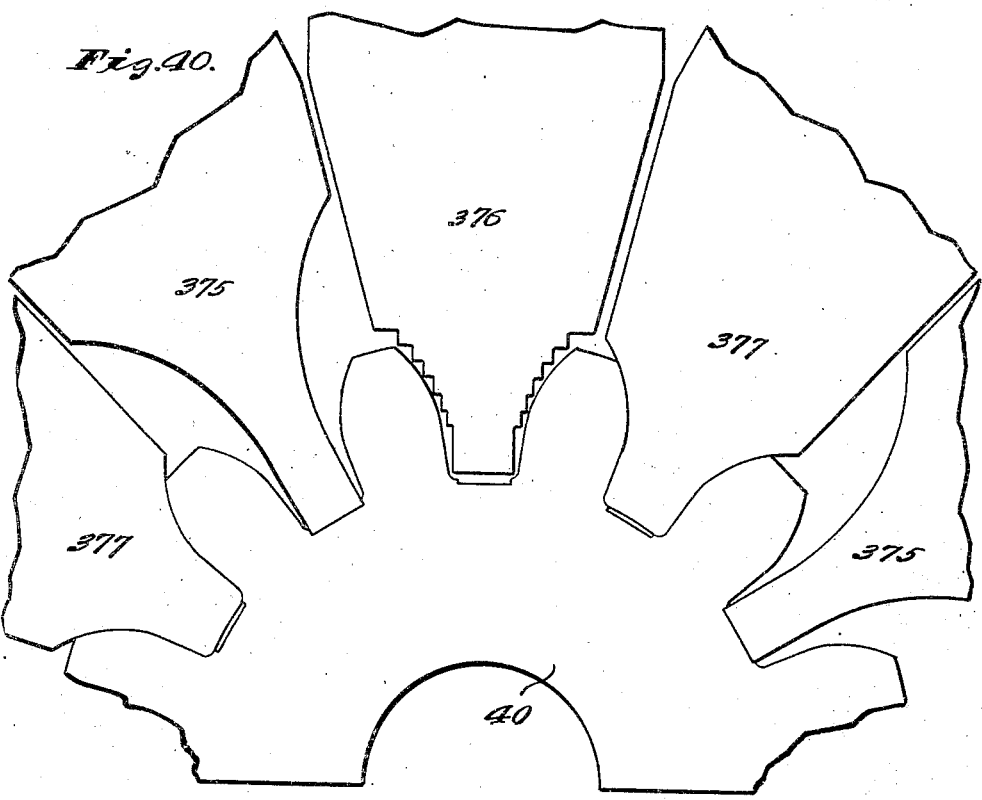
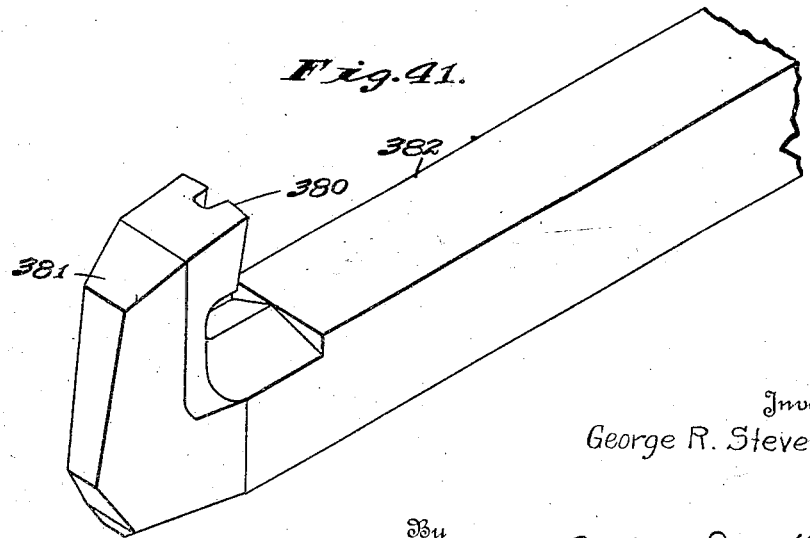
Inventor
George R. Stevenson,
By Arthur M. Hood
Attorney Patented Aug. 26, 1924.

1,506,095

UNITED STATES PATENT OFFICE.

GEORGE R. STEVENSON, OF INDIANAPOLIS, INDIANA, ASSIGNOR TO STEVENSON GEAR COMPANY, OF INDIANAPOLIS, INDIANA, A CORPORATION OF INDIANA.

MACHINE FOR FORMING GEARS OR OTHER POLYGONAL ARTICLES.

Application filed December 17, 1921. Serial No. 523,040.

*To all whom it may concern:*

Be it known that I, GEORGE R. STEVENSON, a citizen of the United States, residing at Indianapolis, in the county of Marion and State of Indiana, have invented a new and useful Machine for Forming Gears or Other Polygonal Articles, of which the following is a specification.

The object of my invention is to produce a machine for cutting gears or other polygonal articles by means of a plurality of circumferentially spaced and simultaneously operating cutters, the blank or blanks being axially reciprocable relative to the cutters and the cutters being successively adjusted toward final position.

Specifically, the object of my invention is to provide various improvements in the details of construction of a machine of the general type described above such details involving the means by which the blank may be reciprocated; by which the blank may be accurately adjusted, so far as its axial movement is concerned, relative to the cutting tools; means by which the blank may be firmly drawn into its seat in the reciprocating means and by which it may be mechanically ejected; means by which the blank may be accurately indexed relative to the circumferential series of cutting tools, etc., where articles symmetrical with the axis are to be produced. Also improvements in the means by which the tool-carrying head is associated with the adjacent structure so that it may be readily removed and replaced and so that the tools may be clamped firmly during the cutting operation and released to permit ready radial adjustment. Also, improvements in the means for feeding the cutting tools to final cutting position; means for automatically compensating back lash in the indexing train and improvements in details of the indexing train so as to insure accuracy of the ultimate product of the machine.

Various other improvements in the details of construction of various portions of the machine will be made to appear in the description, all of such details contributing to a greater or lesser extent toward the production of an efficient machine by means of which may be commercially produced large quantities of accurate product.

The accompanying drawings illustrate my invention. Fig. 1 is a side elevation of a machine embodying my invention; Fig. 2, an elevation of the side opposite to that shown in Fig. 1; Fig. 3, a front elevation; Fig. 4, an axial section, on a larger scale, through the mandrel-carrying ram; Fig. 5, a fragmentary section on a larger scale of the lower end of the mandrel-carrying ram and the mandrel; Fig. 5ª, a plan of the mandrel-carrying spindle; Fig. 6, a vertical section through the tool head on line 6—6 of Fig. 7; Fig. 7, a plan of the tool head; Fig. 8, a fragmentary section on line 8—8 of Fig. 6; Fig. 9, a fragmentary section on line 9—9 of Fig. 6 on a larger scale; Fig. 10, a fragmentary section on line 10—10 of Fig. 9; Fig. 11, a vertical section of the ram reciprocating and adjusting means; Fig. 12, a section on line 12—12 of Fig. 11; Fig. 13, a side elevation in partial vertical section of the tool controlled mechanism; Fig. 14, a section on line 14—14 of Fig. 13; Fig. 15, a section on line 15—15 of Fig. 13; Fig. 16, a section on line 16—16 of Fig. 13; Fig. 17, a section on line 17—17 of Fig. 13; Fig. 18, a fragmentary detail of the operating lever for driving the tool feeding and clamping means; Fig. 19, a section on line 19—19 of Fig. 18; Fig. 20, a section of the power-driven train for adjusting the ram; Fig. 21, a vertical section through the indexing train; Fig. 22, a section on line 22—22 of Fig. 23; Fig. 23, a section on line 23—23 of Fig. 21; Fig. 24, a fragmentary section on line 24—24 of Fig. 21; Fig. 25, a fragmentary section on line 25—25 of Fig. 23; Fig. 26, a fragmentary section on line 26—26 of Fig. 23; Fig. 27, a fragmentary vertical section of the power-driven train for manipulating the mandrel draw bar and the power driven train for manipulating the crane; Fig. 28, a fragmentary section on line 28—28 of Fig. 27; Fig. 29, a fragmentary section line 29—29 of Fig. 27; Fig. 30, a plan of the crane and adjacent parts; Fig. 31, a detail, in partial vertical section on a larger scale, of the crane; Fig. 32, a distorted section through the main drive shaft and the adjacent parts; Fig. 33, a side elevation of an automatic throw-out for the plunger shift; Fig. 34, a plan in partial section of the parts shown in Fig. 33; Fig. 35, a vertical section of a modified form of mandrel and receiving head; Fig. 36, a fragmentary detail of the parts shown in Fig. 35; Fig. 37, a sectional detail of a hand wheel control and friction drive for the feed cam 154; Fig. 38, a fragmentary section on line 38—38 of Fig. 39; Fig. 39, a fragmentary elevation in partial vertical section of the hand wheel; Fig. 40, a diagram of a desirable series of roughing and finishing tools and Fig. 41, a perspective of a tool which may be used for the production of internal work.

The ram.

Referring now to the drawings, blanks 40 are assembled upon a mandrel 41 and held in place by nut 42. Mandrel 41 is provided with a tapered spindle 43 at the root of which is a diametrical key 44 and flange 45, which are firmly seated in and upon a reducing sleeve 46, which is seated in a tapered socket 47 in the lower end of the ram spindle 48, by means of threads 49 at the lower end of the draw bar 50, which extends through the spindle 48 and is rotated by hand or by means of a mechanical drive illustrated in Figs. 21 to 26, the details of which will be described later.

The spindle 48 projects through, and is carried by the ram sleeve 51 which is provided with a series of rack teeth 52. The ram sleeve is reciprocably mounted and guided in vertical guides 53 in the main frame of the machine.

In order to insure a uniform replacement of sleeve 46 and spindle 43, I provide a spring plunger 54 mounted in spindle 48 and projecting through a single perforation 46' in the flange of sleeve 46, and into a socket 45' in flange 45.

A backing washer 40', preferably preliminarily toothed and hardened, is mounted on the mandrel to form an abutment for blanks 40 and to serve to shear the tool chips as the tools emerge from the upper blank.

The ram drive and adjustment.

In order to provide proper periods within which the cutting tools may be adjusted and within which the blank may be indexed relative to the cutting tools, the total stroke of the ram, in the embodiment of my invention shown in the drawings, must be about twenty-five per cent greater than the axial length of the blank. Stated in another way, the periods during which tool adjustment and blank indexing must be accomplished require about one-fourth of the angular movement of the main drive shaft, irrespective of the axial length of the various blank sets which may be put into the machine for new position.

The main drive shaft 55 carries a face plate 56 having a diametrical slot 57 in which is adjustably mounted the wrist pin 58, adjustment being made by means of a temper screw 59. The precise details of the construction of this adjustable wrist pin may be varied according to well known practice, but, in order that an average workman may readily adjust the pin so as to give a stroke of ram which will be commensurate with any given length of blank, I provide, adjacent the path of adjustment of travel of the wrist pin head a graduated marking 60 expressed in terms of length of blank increasing by a percentage which will provide for the proper clearance, to which reference has been made; that is to say, if a given blank measures two inches, the workman will set the wrist pin at the two inch measurement and this will produce a two-and-a-half inch movement of the ram. The wrist pin 58 is connected by a pitman 61, with a cross head 62 mounted to slide in a suitable slide 63 on the main frame. Journaled in the cross head 62 is a worm 64, which primarily acting as a rack, meshes with a gear 65 carried by a shaft 66 journaled in suitable bearings on the main frame and provided with pinion 67 which meshes with rack 52. The worm 64 is carried by or connected to a shaft 68 which is rotatable in the cross head 62 and is capable of being driven in either direction by a train of gearing 69 driven by a shaft 70 (Figs. 11 and 20) which carries a clutch 72 cooperating with reversing gearing 73 of ordinary form, driven from any suitable source of power on the machine.

The details of this gearing are entirely immaterial, it being merely sufficient that some sort of reversing gearing, controlled by the controlling member 74 which acts upon the clutch 72, be provided so that the worm 64 may be rotated by power so that the blank may be accurately adjusted so as to be properly coordinated relative to the cutting tools and the angular position of the wrist pin 58.

In order that the above specified angular relationship may be readily established, a mark 75 (Fig. 1) on disk 56 should be brought into registry with a pointer 76 and then worm 64 rotated on its axis in the proper direction and to the desired extent to bring the lowest edge of the blank 40 to the cutting plane of the tools (Fig. 11).

The reversing driving gearing 73 is utilized by the operator to raise the ram an amount sufficient to provide enough clearance to permit the blank holding mandrel to be dropped out from the ram spindle and still clear the cutting tools. I, therefore, provide shaft 68 with threads 77 upon which is a hexagonal nut 78, which may abut either against the bracket 79 or bracket 80. This nut is provided at each of its faces with a threaded hole 81 into which a cap screw 82, carried by a block 83, slidable in guides 84 on cross head 62, may be entered, the arrangement being such that when screw 82 is withdrawn, block 83 may be temporarily removed and thereupon the nut 78 may be free to rotate with shaft 68 without longitudinal movement on threads 77.

When the mandrel has been properly corelated with the cutting tools, nut 78 is turned up by hand against bracket 79 so as to thus firmly hold the worm 64 against any back lash, and thereupon screw 82 is inserted into the proper hole 81 and block 83 thus co-ordinated with guides 84 and nut 78. Thereupon manipulation of the reversing gear control 74 to cause proper rotation of shaft 68 to raise the ram, will permit such raising action until nut 78 contacts with bracket 80, whereupon the properly formed teeth of clutch 72 will permit slippage of the reversing gearing if the operator has not previously shifted the clutch 72 to an intermediate position.

When a new blank mandrel has been placed, carrying blanks like those which have just been operated upon, the operator without any special care may cause downward movement of the ram, by rotation of the worm rack 64, until the slippage of clutch member 72 notifies him that nut 78 is properly jammed up against bracket 79 and thus without delay establish the proper relationship between the newly set blank and the cutting tools.

The cutter head.

The cutter head which I propose to use in this machine is, in its essential characteristics, like that which forms the subject matter of co-pending application Serial Number 467,503. Generally speaking, a series of circumferentially spaced cutting tools 90 are seated in radial seats in ring 91, and are radially adjusted by means of a series of cams 92, co-acting with pins 93, carried by each tool, the series of cams 92 being carried by a cam ring 94 provided with circumferential teeth 95 by means of which it may be oscillated, in the manner to be described, so as to alternately retract the cutters, for clearance on the upward stroke of the ram, and advance the cutters for the next cutting operation immediately preceding the downward stroke of the ram. Surmounting the tools 90, is a clamping ring 97 which is held in place and manipulated by means of a series of bolts 98 passing down through head 91 and having their heads 99 in a T-slot 100, formed in a ring 101, provided with a series of internal teeth 102 designed to be interlocked beneath external teeth 103 carried by the cylindrical member 104, the arrangement being such that by bringing teeth 102 into registry with the spaces between teeth 103, the cutter carrying head may be vertically withdrawn, and, by seating the teeth 102 beneath teeth 103, a downward pull upon member 104 may be exerted upon the clamping ring 97, so as to clamp tools 90 firmly in their seats.

In order to facilitate the angular movement of ring 101, it is provided with an external set of teeth 105 which will mesh with the pinion 106 let into a suitably formed pocket in base ring 107 and meshing with the bevel teeth 108 at the inner end of a pin 109, which is journaled in ring 107 and is capable of limited angular movement sufficient to move ring 101 through enough of an angle to establish the desired relationship between the teeth 102 and 103. This result is accomplished by providing a bushing 110 surrounding the stem of pin 109 and having a notch 111 of limited angular extent co-operating with a radial pin 112 carried by pin 109. The bushing 110 is held in any desired angular position by a wedge 113 held in place by bolt 114 (Fig. 9). It will be seen that by loosening bolt 114, pin 109 may be rotated to any desired extent whereas, by tightening bolt 114, bushing 110 will be firmly held and consequently the angular movement of pin 109 will be limited by the co-action between pin 112 and the notch 111.

In order that the weight of ring 101 may not hang upon the clamping ring 97 and thus tend to hold the tools 90 in their seats, I provide springs 116 (Fig. 6) which support the weight of rings 101 and 97. The cylindrical member 104 has an axial interlocking engagement with a supporting ring 117 (Fig. 6) and the weight of this ring and the member 104 is borne by springs 118.

Surrounding the member 104 near its lower end is a ring 120 which is provided with internal vertical guides 121 into which pins 122, carried by member 104 are projected, so as to prevent lateral displacement of the member 104. The downward pull upon member 104 is exerted by means of a shaft 123 projected diametrically through member 104 and provided with eccentric portions 125 which are seated in bearings 126 at the lower end of a pair of rocker struts 127, which at their upper ends lie in pockets 128 in ring 120, said pockets permitting a slight rocking of the struts 127 to compensate the eccentricity of the eccentric portion 125. Shaft 123 is oscillated by an arm 130 which is connected with slide 131 (Fig. 32) reciprocated by cam 132 on shaft 55, a spring 133 holding the slide in engagement with the cam, and acting to turn shaft 123 in the tool-clamping direction.

The tool control.

As previously stated, the tools 90 are controlled in their radial movement by cams 92 which may be oscillated by an oscillation of the cam-carrying ring 94. Preceding each upward stroke of the ram, tools 90 need to be backed off and preceding each downward stroke the tools need to be moved inwardly an amount equal to the backing off movement plus an amount equal to the depth of the next cut. For this purpose, the teeth 95, of ring 94, mesh with pinion 140 (Figs. 13 and 14), which mesh with a gear 141 carried by a shaft 142 carrying a worm wheel 143 which meshes with a worm rack 144 carried in a slide 145.

In the normal operation of the machine, a worm 144 serves merely as a rack to cause oscillation of worm wheel 143. Slide 145 is normally driven in the direction indicated by the arrow in Fig. 13, by spring 146 to cause movement of ring 94 in the direction to withdraw the tools 90. Worm 144 is manually rotated in a slide 145 so that the tools 90 may be adjusted in any direction by hand.

Pivoted to slide 145 is a lever 147 connected, at its outer end, by a pitman 148 with a lever 149 pivoted to the main frame and reciprocated, once for each cycle of movement of the ram, by a cam 150 against which the lever 149 is held by a spring 151 acting upon a link 152, which is pivoted to lever 149. Lever 147 carries a roller 153 which is normally held against cams 154 which has a throw sufficient to cause, through lever 147, a movement of ring 94 through an arc equal to the angular distance of one of the cams 92.

Cam 154 is gradually advanced as the cutting operation proceeds and for this purpose a worm wheel 155, connected to cam 154, meshes with a worm 156 carried by a shaft 157 provided with ratchet wheel 158 engaged in one direction by pawls 159 carried by a casing 160 having a pinion 161 which meshes with a segment 162, and this segment is connected by a pitman 163 with a block 164 which is adjustable in a slot 165 in lever 149, the extent of reciprocation of segment 162 being indicated by suitable graduations 166 along side of slot 165. The backward movement of shaft 157 is prevented by a ratchet wheel 167 carried by shaft 157 and engaged by a pa 1 168 pivoted on a suitable bracket 169 attached to the main frame.

The above described arrangement is such that lever 147 normally pivots about the axis of roller 153 and thus reciprocates so as to cause oscillation of cam ring 94 and thus cause reciprocation of the tools 90. In the meantime, cam 154 is advanced step by step, by the action of segment 162 and the cam ring 94 thus gradually advanced so that the tools 90 are gradually advanced.

The depth of the final position of tools 90 relative to the blanks is controlled by a stop 171 carried by ring 94 ultimately coming into engagement with a stop 172 provided with an ordinary micrometer adjusting means 173 mounted on the main frame of the machine. Whenever stop 171 comes into engagement with stop 172 there can be no further movement of slide 145 in the direction opposite to that indicated by the arrow in Fig. 13 because the swinging movement of lever 147 in that direction is produced by spring 151.

By the above described construction, reciprocation of slide 145 causes oscillation of ring 94 through an angle sufficient to provide clearance of the tools 90 on the upward stroke of the ram and just preceding each downward stroke of the ram, cam 154 is advanced enough to provide for the next cut of the tools so that on the next feed stroke of slide 145, the tools are brought inwardly to position for the next cut.

*Indexing mechanism.*

At point I (Fig. 1), the ram spindle 48 has secured to it a cross head 180 and this cross head is provided with a semi-cylindrical bearing surface 180' and two radial bearing surfaces 180", which oppose the semi-cylindrical bearing surface 180'. A rotatable ring 181, mounted in suitable bearings in portion I of the main frame, is provided with a member 182 affording an angularly-interlocking axially sliding connection between the cross head 180 and ring 181, so that the ram spindle 48 is free to be axially reciprocated through ring 181 while partaking of all angular movements of said ring.

Secured to ring 181 is a gear 183 which meshes with one member of a compound gear 184 carried by a stud 185 on the free end of the swinging arm 186. The other member of the compound gear 184 meshes with a gear 187 carried by a shaft 188 which also carries the star wheel 189 of a Geneva gear, of slightly modified form.

The ram spindle 48 must, if accuracy of product be attainable, be held against any possible angular movement during tooth formation and any back lash in the gear train 183—184—187 must be eliminated if this train is depended upon to hold the ram spindle angularly after indexing. In order to accomplish this result, the swinging arm 186 is normally urged, by spring 190, to a position where the teeth of gear 184 are crowded tightly into the teeth of gears 183 and 187 so as to eliminate all possibility of back lash, a wedge 191 on arm 186 being crowded into a pocket 192 in a supporting frame 193 which is angularly adjustable, by means of the slot and bolt connection 194 (Fig. 23) about the axis of the ram spindle 48.

In order that proper adjustments of the gears may be made, that portion of pin 185 upon which he compound gear 184 is mounted, is eccentric slightly to that portion of the pin which is in arm 186 so that, by angular adjustment of pin 185 in arm 186, the compound gear 184 may be shifted laterally upon arm 186. The arm 186 is bifurcated at its rear end, fitted over a plate 195 on carrier 193 and pivoted by means of a bolt 196.

The arrangement above described is such that, gear 187 being rotated in the direction indicated by the arrow in Fig. 23, its action upon gear 184 is such as to tend to swing or shift said gear outwardly relative to both gears 187 and 183 so as to bring gear 184 into such position that proper clearances with gears 183 and 187 are provided. The outward movement of arm 186 is limited by engagement with the housing for spring 190. As soon, however, as the driving force on shaft 188 is withdrawn, spring 190 serves to crowd gear 184 back into tight mesh with gears 187 and 183, and thus firmly hold the ram spindle 48 against angular movement.

The star wheel 189 is provided with radial guides 200 which form guide ways for the roller 201 carried by wrist pin 202 on the disk 203, carried by shaft 204. In the main, this construction is that commonly found in the so-called Geneva gear and between each guide 200 the star wheel 189 is provided with the usual interlocked surfaces 205 which are arranged to interlock with the properly shaped block 206 (see dotted lines in Fig. 24) carried by shaft 204, the arrangement being such that the block 206 contacts with a surface 205 during the time of travel of roller 201 from one guide 200 to the next guide.

Heretofore in a train of this character there has been the possibility of slight independent movement of the star wheel just as the roller enters a radial groove of the star wheel and there has been a consequent noisiness of operation and ultimate wear, tending to inaccuracy. Consequently, the guides 200 are slightly extended radially and eased out, as indicated in dotted lines in Fig. 24, so that the roller 201 enters the grooves gradually.

In order to additionally insure a firm holding of the shaft 188, star wheel 189 is provided with a series of wedge-shaped notches 211 into which a locking dog 212 is projected at the proper time by spring 213. The dog 212 is removed and held out of locking position, at the proper time in each rotation of shaft 204, by means of a cam 214 carried by shaft 204.

In order to provide for the proper degrees of accuracy in co-relation of the parts, gear 187 should be angularly adjustable with relation to the star wheel 189 and for that purpose shaft 188 carries a flange 218 having an annular series of teeth 219 which receive corresponding teeth on ring 217. Secured to gear 187, which is itself rotatable on shaft 188, is a ring 216 which on one face has teeth 216' meshing with corresponding teeth on ring 217, and on the other face has teeth meshing with teeth 215 on the adjacent face of gear 187. The number of teeth 219 is one, more or less, than the number of teeth on ring 216.

Secured to plate 203 is a gear 221 which meshes with a gear 222 (dotted lines, Fig. 21) carried by shaft 223 driven by gears 224 and 225 (Fig. 32) from the main shaft.

The amount of angular movement of the spindle 48 for each rotation of the main shaft is determined by the relation between the gears 187, 184 and 183, and by changing gears 187 and 184, any desired relationship can be attained.

A distance ring 220 having a segmental spherical face seated in a proper socket is interposed between gear 187 and ring 216 so as to compensate any inaccuracies in the clutch rings.

*Power actuation of the draw bolt.*

The draw bolt 50 might be operated by hand, but that would be a tedious operation, and consequently, said bolt is extended upwardly considerably beyond the ram spindle 48 and is extended through gears 230 and 231 (Fig. 27) and an intermediate clutch 232 into which the draw bolt 50 is splined. Gears 231 and 232 are driven in opposite directions by a gear 233 and a gear pair 234—235, respectively, the gears 233 and 234 being carried by shaft 236, which is driven, through the medium of gears 237 (Fig. 27), 238, 239, 240 and shaft 241 and gears 243 (Fig. 20). Gear 243 is driven by the gears 73 one of which is carried by a shaft 244 driven by a sprocket wheel 245 and chain 246 which connects with an element of a change speed gear box 247, the details of which are not important, it being merely advisable to provide some convenient means by which the change of speed may be obtained if desired.

Clutch 232 is preferably provided with teeth, cooperating with teeth on the gears 230 and 231, of such character that excessive resistance will be avoided by a slippage of the clutch to neutral position. This clutch may be operated by a yoke 250 controlled through suitable connections 251 from a hand lever 252 (Fig. 3).

*The crane.*

A crane arm 260 provided with a bifurcated platform 261, is provided to receive the blank-carrying mandrel and swing it into and out of alinement with the ram spindle. Crane 260 is rotatably supported upon a vertical shaft 262 which carries a nut 263 mounted on threads 264 formed in the lower end of the shaft 262. A spring 265 is interposed between nut 263 and crane 260 so that the weight of the crane is carried by the spring 265. Nut 263 has a non-rotative sliding connection with the crane shaft 262 as indicated at 266.

Shaft 262 is connected to gears 270 and 271 (Fig. 3) with a shaft 272 which passes through gear 239 and a companion gear 273 (Fig. 27). The two gears 239 and 273 are connected by the gear 240 and a clutch 274 is splined upon shaft 272 in position to cooperate alternately with the two gears 239 and 273. Clutch 274 may be manipulated by hand lever 275 and also by an automatic shifting mechanism which comprises a rod 276 (Fig. 1), lever 277, rod 278 and adjustable fingers 279 and 280, said fingers being engaged, at the limits of downward and upward movement respectively, of the crane 260, so as to automatically shift the clutch member 274 to medial position.

*Disposal of débris.*

The chips produced by tools 90 fall downwardly through ring 91 into cylinder 104, passing downwardly through openings 300 into the bottom of said cylinder, and preferably falling into a hopper 301 (dotted lines, Fig. 3), which will deliver the chips to an endless conveyor 302 driven by any suitable train from one of the constantly moving shafts of the machine.

*Some details and modifications.*

If it is thought undesirable to depend upon a yieldable form of tooth on the clutch 72, automatic throw-out means may be provided to limit the action of the driving train by an automatic positive separation of the clutch members (as shown in Figs. 33 and 34). In this construction the shaft 70' (corresponding with shaft 70 of the construction shown in Fig. 20) is provided, beyond its gear 69 with a threaded extension 330 on which is mounted a nut 331. Nut 331 carries, and is prevented from rotating by, a slide block 332 which is sleeved upon shift rod 74 between adjustable stop blocks 333, the construction being such that a shifting of rod 74 manually will cause movement of unit 331 in the opposite direction and a consequent ultimate engagement of block 332 with the appropriate block 333 to return rod 74 to neutral.

In Figs. 35 and 36 I show a ram head modification which insures a uniform relation between the ram and the blank-arbor. In this construction the spindle 48' has its lower flanged end provided with a depending finger 340 which must be seated in the outer end of a notch 341 formed in the flange of sleeve 342 (corresponding to sleeve 46). Mounted in the bottom of notch 341 is a depending finger 343 which must be seated in a notch formed in the edge of flange 344 of mandrel 345. By this means the sleeves and mandrel are held against relative rotation and always assembled in the same angular relationship.

In Figs. 37 to 39 I show a modification by which the operation of the machine may be speeded up and the tools adjusted by hand. Cam 154' (corresponding to cam 154 of Fig. 1) is journalled upon the hub 155'' of the driving gear 155' and carries a hand wheel 350. Gear 155' carries a friction element 351 against which cam 154' is held, with more or less force, by the friction element 352 and nut 353 threaded on hub 155''. When nut 353 is loosened to permit hand wheel 350 to be turned to manually adjust the cam 154', there would be a tendency, at some points in the cam, for the cam to be run back under the pressure of spring 151 if the hand wheel is released. To prevent such action I provide the hand wheel with a circular groove 354 in which is arranged a frictional drag member 355 carried by the main frame.

In Fig. 40 I show a gang of cutters which, in conjunction with the indexing mechanism already described, serve efficiently in the rapid and accurate formation of toothed elements. Here the gashing tool 375 is only wide enough to approximate the bottom of the valley between two teeth; the roughing tool 376 will approximate the shape of the desired space between two teeth, and the finishing tool 377 will produce the final desired form.

The cams 92 for these tools will be appropriately formed so that the roughing tools will be slightly in advance of the finishing tool until near the end of the cutting cycle and will then lag behind while the finishing tool will be appropriately advanced. Either one, or both, of the gashing and roughing tools may be used in conjunction with a finishing tool although the most efficient results are obtainable when both are used because the finishing tool will then stand up for longer accurate use.

By operating the tools in gangs, as described, the chips from the roughing and finishing tools more readily clear themselves from the tool because of the preliminary channel formed by the preceding tool.

Internal teeth may be readily formed by a tool such as is shown in Fig. 41 where the cutting portion 380 is outwardly presented and carried at the upper end of a post 381 on the shank 382.

The bolts 98 (Fig. 6) having been properly adjusted by nuts 98', it is quite desirable that they be locked in position without disturbing the adjustment, as would be the case if an ordinary lock nut were mounted on the bolt. For this purpose I make the nut 98' extra long and provide lock bolt 98'' adapted to enter the upper end of the nut and engage the top of the bolt. This lock bolt may be set down hard enough against the end of the bolt to prevent accidental turning of the nut without shifting the nut endwise on the bolt.

In case helical gears are desired, it will be readily understood guide 53 and ram sleeve 51 may be provided with appropriately formed helical coacting portions so that the sleeve will be given an appropriate angular movement as a result of its longitudinal movement in the guide 53.

Pins 185, 188, 196 and the pivot pin of dog 212 are provided with eccentric ends in their respective supports so that necessary slight adjustments to insure accurate meshing of the gears and locking dog may be obtained.

*The driving and braking mechanism.*

Power is applied to the machine from any suitable motor connected to a shaft 310 (Fig. 32) provided with a clutch member 311. Rotatably mounted on shaft 310 is a quill 313 carrying a pinion 314 meshing with a gear 315 on shaft 55. The quill 313 carries a clutch member 316 having a sleeve 316' which is rotatably mounted on quill 313 and carries friction members 317, 317 between which may be wedged a stationary friction band 319 held against rotation from any suitable part of the main frame.

Splined to quill 313 is a double friction cup 320, one member of which cooperates with the clutch member 311 and the other of which cooperates with the clutch member 316. The member 320 may be shifted from neutral position into engagement with either of the members 311 or 316 by a yoke 321 threaded upon a screw 322 having a worm 323 by which the screw may be rotated by a rack 324. The arrangement is such that when member 320 is in engagement with member 311, quill 313 will be rotated by shaft 310 and when member 320 is in engagement with member 316 the quill 313 and the moving parts driven thereby will be frictionally braked.

I claim as my invention:

1. The combination of two reciprocable members each provided with a rack, a gear meshing with and connecting said two racks, one of said racks being a worm rotatably mounted for independent rotative movement whereby the relation of the stroke of one rack may be adjusted relative to the stroke of the other rack.

2. The combination of a reciprocable member having a rack, a second reciprocable member, a worm rotatably mounted upon said second member and available as a rack in longitudinal movement of said second reciprocable member, and a gear meshing with and connecting the two racks.

3. The combination of a reciprocable member having a rack, a second reciprocable member, a worm rotatably mounted upon said second member and available as a rack in longitudinal movement of said second reciprocable member, a screw carried by said worm, a nut on said screw, means for holding said nut against rotation, and means for limiting the movement of the nut longitudinally of the screw.

4. In a machine of the class described, the combination of a tool carrier, a reciprocable blank-carrying ram associated with said tool carrier, means for automatically intermittently retracting and advancing the tools relative to the line of movement of the ram, a reciprocable driving member, connections between the reciprocable driving member and the ram for causing reciprocation of the ram by reciprocation of the driving member, and means by which the stroke of the ram may be adjustably coordinated with the movements of the tool carrier, said means comprising a worm rotatably mounted upon one of the aforesaid reciprocating members, a rack on the other reciprocable member, and a connecting gear between the worm and rack.

5. In a machine of the class described, the combination of a tool carrier, a reciprocable blank-carrying ram associated with said tool carrier, means for automatically intermittently retracting and advancing the tools relative to the line of movement of the ram, a reciprocable driving member, connections between the reciprocable driving member and the ram for causing reciprocation of the ram by reciprocation of the driving member, and means by which the stroke of the ram may be adjustably coordinated with the tool carrier.

6. The combination with a rotary member, of means, for intermittently oscillating and gradually advancing said rotary member step-by-step, comprising a reciprocable member, a worm rotatably mounted on said reciprocable member, a gear meshing with said worm and connected with the first mentioned member, a lever connected with said reciprocable member for reciprocating the same, means for reciprocating said lever, a fulcrum on said lever, an adjustable abutment for said fulcrum, and means coordinated with the lever-driving means for shifting said abutment.

7. In a machine of the class described, the combination with an annular tool carrier, a series of circumferentially-spaced tools seated in said carrier, means for advancing and retracting said tools, a clamping ring overlying the tools, a pull-ring underlying the tool carrier, connections between the pull-ring and clamping ring, and means for intermittently drawing upon the tool ring to clamp the clamping ring upon the tools.

8. In a machine of the class described, the combination with an annular tool carrier, a series of circumferentially-spaced tools seated in said carrier, means for advancing and retracting said tools, a clamping ring overlying the tools, a pull-ring underlying the tool carrier, connections between the pull-ring and clamping ring, an actuating member associated with the pull-ring, circumferentially spaced, interdigitable and overlapable cooperating parts carried by the pull-ring and actuating member, means by which the pull ring may be angularly shifted, and means by which the actuating member may be axially shifted to clamp and release the clamping ring relative to the tools, said means comprising an actuating shaft journaled in the actuating member and provided with an eccentric portion, and a bearing for said eccentric portion, said bearing being supported so as to be capable of rocking laterally upon rotation of the actuating shaft.

9. In a machine of the class described, the combination with an annular tool carrier, a series of circumferentially-spaced tools seated in said carrier, means for advancing and retracting said tools, a clamping ring overlying the tools, a pull-ring underlying the tool carrier, connections between the pull-ring and clamping ring, an actuating member associated with the pull ring, and means by which the actuating member may be axially shifted to clamp and release the clamping ring relative to the tools, said means comprising an actuating shaft journaled in the actuating member and provided with an eccentric portion, and a bearing for said eccentric portion, said bearing being supported so as to be capable of rocking laterally upon rotation of the actuating shaft.

10. In a machine of the class described, the combination with an annular tool carrier, a series of circumferentially-spaced tools seated in said carrier, means for advancing and retracting said tools, a clamping ring overlying the tools, a pull-ring underlying the tool carrier, connections between the pull-ring and clamping ring, an actuating member associated with the pull ring, circumferentially spaced, interdigitable and overlapable cooperating parts carried by the pull-ring and actuating member, and means by which the actuating member may be axially shifted to clamp and release the clamping ring relative to the tools, said means comprising an actuating shaft journaled in the actuating member and provided with an eccentric portion, and a bearing for said eccentric portion, said bearing being supported so as to be capable of rocking laterally upon rotation of the actuating shaft.

11. In a machine of the class described, the combination with an annular tool carrier, a series of circumferentially-spaced tools seated in said carrier, means for advancing and retracting said tools, a clamping ring overlying the tools, a pull-ring underlying the tool carrier, connections between the pull ring and clamping ring, an actuating member associated with the pull-ring, circumferentially spaced, interdigitable and overlapable cooperating parts carried by the pull-ring and actuating member, means by which the pull ring may be angularly shifted, and means by which the actuating member may be axially shifted to clamp and release the clamping ring relative to the tools.

12. In a machine of the class described, the combination with an annular tool carrier, a series of circumferentially-spaced tools seated in said carrier, means for advancing and retracting said tools, a clamping ring overlying the tools, a pull-ring underlying the tool carrier, connections between the pull-ring and clamping ring, an actuating member associated with the pull-ring, circumferentially spaced, interdigitable and overlapable cooperating parts carried by the pull-ring and actuating member, means by which the pull ring may be angularly shifted, and means by which the actuating member may be axially shifted to clamp and release the clamping ring relative to the tools, said means comprising an actuating shaft journaled in the actuating member and provided with an eccentric portion, and a bearing for said eccentric portion.

13. In a machine of the class described, the combination with an annular tool carrier, a series of circumferentially-spaced tools seated in said carrier, means for advancing and retracting said tools, a clamping ring overlying the tools, a pull-ring underlying the tool carrier, connections between the pull-ring and clamping ring, an actuating member associated with the pull-ring, and means by which the actuating member may be axially shifted to clamp and release the clamping ring relative to the tools.

14. In a machine of the class described, the combination with an annular tool carrier, a series of circumferentially-spaced tools seated in said carrier, means for advancing and retracting said tools, a clamping ring overlying the tools, a pull-ring underlying the tool carrier, connections between the pull-ring and clamping ring, an actuating member associated with the pull-ring, circumferentially spaced, interdigitable and overlapable cooperating parts carried by the pull-ring and actuating member, and means by which the actuating member may be axially shifted to clamp and release the clamping ring relative to the tools.

15. In a machine of the class described, a gear train comprising a driving gear, a driven gear, an intermediate gear meshing with said driving and driven gears, a carrier for said intermediate gear, and means by which said intermediate gear will, under the action of the driving gear, be automatically shifted relative to the driving and driven gears to afford an easy running interengagement and, when the driving gear is stationary, will be firmly seated in engagement with the driving and driven gears to eliminate back lash.

16. In a machine of the class described, a gear train comprising a driving gear, a driven gear, an intermediate gear meshing with said driving and driven gears, a carrier for said intermediate gear, and a yielding abutment for said carrier yielding under the driving force of the driving gear to permit the intermediate gear to shift, relative to the driving and driven gears, to afford an easy running fit and acting, when the driving gear is stationary, to crowd the intermediate gear tightly into engagement with the driving and driven gears.

17. In a machine of the class described, a gear train comprising a driven gear, a driving gear connected with said driven gear, a Geneva-gear-train comprising an intermittently actuated member connected with the aforesaid driving gear, a driving member for said intermittently actuated member and forming part of said Geneva-gear, a locking-dog cooperating with said intermittently-operated member, and a cam for intermittently throwing said dog into and out of locking engagement with said intermittently-operated member.

18. In a machine of the class described, a gear train comprising a driving gear, a driven gear, an intermediate gear meshing with said driving and driven gears, a carrier for said intermediate gear, and a yielding abutment for said carrier yielding under the driving force of the driving gear to permit the intermediate gear to shift, relative to the driving and driven gears, to afford an easy running fit, a support for said carrier movable about the axis of the driven gear, and means for holding said support in different positions of angular adjustment relative to the driven gear.

19. In a machine of the class described, the combination of a tool carrier, a reciprocating ram associated with said tool carrier, means by which said ram may be reciprocated, means for intermittently angularly shifting the ram, a blank mandrel, a draw bar rotatably mounted in the ram and having a rotatable interlocking engagement with the mandrel, a power driving train associated with said draw bar, means for manually controlling said train, means for reciprocating the ram, and means for adjusting the position of stroke of the ram relative to the tool carrier and ram rotating means, said means comprising a longitudinally reciprocable worm rotatably adjustable, a rack, and an intermediate gear between the worm and rack.

20. In a machine of the class described, the combination of a tool carrier, a reciprocating ram associated with said tool carrier, means by which said ram may be reciprocated, means for intermittently angularly shifting the ram, means for reciprocating the ram, and means for adjusting the position of stroke of the ram relative to the tool carrier and ram rotating means, said means comprising a longitudinally reciprocable worm rotatably adjustable, a rack, and an intermediate gear between the worm and rack.

21. In a machine of the class described, the combination of a tool carrier, a reciprocating ram associated with said tool carrier, means by which said ram may be reciprocated, means for intermittently angularly shifting the ram, a blank mandrel, a draw bar rotatably mounted in the ram and having a rotatable interlocking engagement with the mandrel, a power driving train associated with said draw bar, means for manually controlling said train, means for reciprocating the ram, and means for adjusting the position of stroke of the ram relative to the tool carrier and ram rotating means.

22. In a machine of the class described, the combination of a tool carrier, a reciprocating ram associated with said tool carrier, means by which said ram may be reciprocated, means for intermittently angularly shifting the ram, and means for adjusting the position of stroke of the ram relative to the tool carrier and ram rotating means.

23. In a machine of the class described, the combination with a tool carrier, a reciprocable mandrel carrying ram, a crane arranged adjacent the tool carrier and ram provided with a mandrel-supporting portion moving into and out of alinement with the ram, and means for raising and lowering the crane.

24. In a machine of the class described, a tool-carrying head, a radially movable tool carried by said head, a clamping member engaging the tool to clamp it in the head, a bolt extending through the head and clamping member, a nut on the bolt engaging the clamping member and extending beyond the end of the bolt, a lock bolt threaded into the extended part of the nut and engaging the bolt, and means for engaging the bolt to move it toward and from the tool.

25. In a machine of the class described, the combination of an intermittently moving rotary member, a driving member intermittently engaging the driven member to advance it step by step, a locking dog engaging the driven member to hold it against movement during a portion of each driving engagement of the driving member, and means synchronized with the driving member for intermittently moving the locking dog out of engagement with the driven member.

26. In a machine for forming polygonal articles, the combination of a blank supporting mandrel, a tool cooperating with said mandrel, by relative longitudinal movement to produce a notch in the blank carried by the mandrel, and a preliminary formed backing washer carried by the mandrel and forming a backing for the blank which is engaged by the cutter at the end of its forming stroke, said backing washer having a preliminary form corresponding to the final form of the blank.

27. In a machine of the class described, the combination of a tool holder, a circumferential series of radially arranged and radially movable tools carried by said holder, a cam structure rotatable about the axis of the tool holder and provided with a series of cams engaging the several tools to shift the same radially of the holder, means for rotating said cam structure, said means comprising an operating member, a single acting shifting member acting upon the operating member to shift the cam structure in a tool retracting direction, and a spring operating upon the operating member to shift the cam structure in tool advancing direction, and an adjustable stop arranged to limit the movement of the cam structure in tool advancing direction, said adjustable stop comprising a graduated micrometer adjusting member.

28. In a machine of the class described, the combination of a tool holder, a circumferential series of radially arranged and radially movable tools carried by said holder, a cam structure rotatable about the axis of the tool holder and provided with a series of cams engaging the several tools to shift the same radially of the holder, means for rotating said cam structure, said means comprising an operating member, a single acting shifting member acting upon the operating member to shift the cam structure in a tool retracting direction, and a spring operating upon the operating member to shift the cam structure in tool advancing direction, and an adjustable stop arranged to limit the movement of the cam structure in tool advancing direction.

29. In a machine of the class described, the combination of a circumferential series of gangs of cutting tools, each gang comprising a finishing tool and an immediately preceding roughing tool, and means for feeding said tools radially, the roughing tool in advance of the finishing tool through the major portion of a cycle and, toward the end of the cycle, the finishing tool in advance of the roughing tool.

30. In a machine of the class described, the combination of a circumferential series of gangs of cutting tools, each gang comprising a finishing tool and an immediately preceding roughing tool, and means for feeding said tools radially.

31. In a machine of the class described, the combination of a circumferential series of gangs of cutting tools, each gang comprising a gashing tool, an immediately succeeding roughing tool and an immediate succeeding finishing tool, means for feeding said tools radially, the gashing tool and roughing tool in advance of the finishing tool through the major portion of a cycle and the finishing tool in advance of the roughing tool at the end of a cycle.

32. The combination of a shaft provided with a flange having a circumferential series of teeth, a clutch washer sleeved upon the shaft and having two circumferential series of teeth, one meshing with the first mentioned series of teeth and the other having a different angular spacing of teeth, a second clutch washer having a circumferential series of teeth corresponding to the last mentioned circumferential series, a gear sleeved upon the shaft, interengaging members carried by the gear and last mentioned clutch washer to prevent relative rotation, and a distance ring inserted between said gear and last mentioned washer and having a ball and socket engagement with one of said members.

In witness whereof, I, GEORGE R. STEVENSON, have hereunto set my hand at Indianapolis, Indiana, this 14th day of December, A. D. one thousand nine hundred and twenty-one.

GEORGE R. STEVENSON.